Jan. 20, 1959   H. H. MATHEWS   2,870,320
ELECTRIC ARC WELDING
Filed May 27, 1955   2 Sheets-Sheet 1
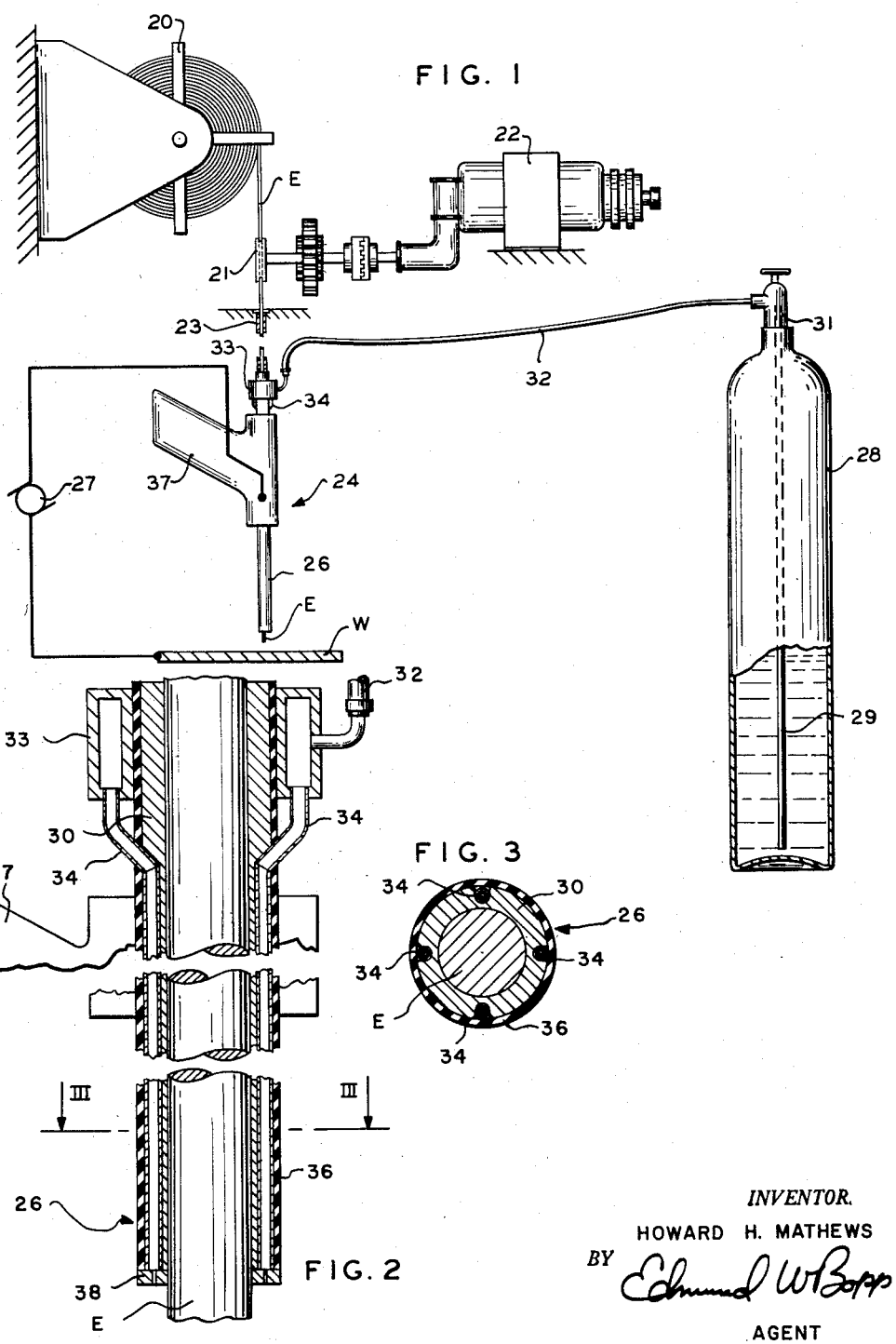
INVENTOR.
HOWARD H. MATHEWS
BY Edmund W Bopp
AGENT Jan. 20, 1959     H. H. MATHEWS     2,870,320
ELECTRIC ARC WELDING Filed May 27, 1955                                                2 Sheets-Sheet 2

*INVENTOR.*
HOWARD H. MATHEWS
BY *Edmund W Bopp*
AGENT

United States Patent Office 2,870,320
Patented Jan. 20, 1959

2,870,320
ELECTRIC ARC WELDING

Howard Hume Mathews, Mountain Lakes, N. J., assignor to Air Reduction Company, Incorporated, New York, N. Y., a corporation of New York Application May 27, 1955, Serial No. 511,657

8 Claims. (Cl. 219—74)

This invention relates to gas shielded metal arc welding and more particularly to consumable electrode arc welding wherein liquid carbon dioxide is expanded in the vicinity of the arc to provide the arc shielding gas.

Gas shielded metal arc welding is conventionally practiced by striking an arc between a workpiece and the end of a continuously fed consumable wire electrode. The arc is shielded from the ambient air with a blanket of shielding gas such as argon or carbon dioxide which heretofore has been fed to the arc in gaseous form through gas hoses and passages connecting the gas cylinders and the welding gun.

An object of the present invention is to provide gas shielded arc welding methods and apparatus in which a shielding gas is delivered to the welding zone in liquid phase.

Another object is to provide gas shielded arc welding method and apparatus in which the arc shielding medium acts to refrigerate the apparatus.

Another object is to provide an improved gas shielded arc welding apparatus of high current capacity and relatively small size.

These and other objects and advantages of the invention will be pointed out or will become apparent from the following detailed description and the accompanying drawings.

According to the present invention, the arc shielding medium is conveyed from its source to the arc as a liquid and then is converted to gaseous state at or in the immediate vicinity of the arc. This provides two important advantages; (1) the overall size of the welding gun is greatly reduced, and (2) refrigeration is provided for the arc end of the guide or contact tube through which the electrode wire is fed to the arc and/or for the nozzle from which shielding gas may be discharged around the arc. The size of the welding gun is reduced by the present invention because all or a portion of the arc shielding gas is fed through the gun apparatus in the liquid state and is not converted to the gaseous state until it reaches the arc. A given mass of shielding gas will, of course, occupy a very greatly reduced volume when converted to the liquid state; hence the size of the conveying ducts or passages in a welding gun constructed according to the present invention are of extremely small cross-sectional size with consequent reduction in the overall size of the welding gun.

Refrigeration for the arc end of the welding gun is provided by the present invention as a result of the cooling effect produced by the tremendous expansion of the shielding medium as it is converted from the liquid to the gaseous state. The liquid absorbs the heat of vaporization and provides a much greater cooling effect in a more concentrated area than would be produced by a mere expansion of gas per se.

It is possible to utilize this concentrated cooling effect in conjunction with the small size shielding medium (liquid) passages as mentioned above to provide a welding gun of exceptionally high current capacity in relation to its overall size. Because gas passages are substantially eliminated the arc end of the gun can be made of relatively small diameter. Consequently, the total amount of heat absorbed by the arc end of the gun is very much less per unit of arc time than is the case with conventional guns having relatively large diameter gas passages surrounding the electrode guide and contact tube. Further, this small size arc end or gun tip is directly subjected to a concentrated refrigeration effect provided by the vaporization and expansion of the shielding medium from liquid to gaseous state. This combination of less heat pick-up plus concentrated cooling enables guns to be made which will carry exceptionally large welding currents to the arc without overheating. This can be done without the necessity of providing a separate cooling medium such as the cooling water conventionally used to cool heavy duty arc welding guns. The shielding gas provides the necessary refrigeration when it is converted from the liquid to the gaseous state and no separate cooling medium need be used.

It would be possible to practice the present invention with any shielding medium that can be liquefied at safe pressures and expanded to form a gas which provides a satisfactory arc shielding atmosphere. In commercial practice the gas must also be inexpensive, as a practical matter. Carbon dioxide fulfills all these requirements and is the preferred shielding medium for the practice of the invention. It can be liquefied at room temperature at a safe working pressure. It can be expanded readily from liquid to gaseous form to provide temperatures of the order of $-75°$ to $-85°$ centigrade in the expanded gas stream. It is cheap, being readily available on a commercial basis in cylinders wherein it is held at room temperature as a liquid under a pressure of the order of 800 lbs. per square inch. It is satisfactory per se as a shielding gas for some welding arcs and can be used in conjunction with other shielding gases as a shielding medium for many types of welding arcs.

A detailed description of certain presently preferred embodiments of the invention is given below in connection with a description of Figures 1 to 12 of the accompanying drawings.

Figure 1 is a semi-schematic drawing of a welding system according to the present invention.

Figure 2 is a view on an enlarged scale of a portion of the barrel of the welding gun in Figure 1.

Figure 3 is a section of the barrel of the welding gun of Figures 1 and 2 taken in the plane indicated by line 3—3 on Figure 2.

Figure 4:
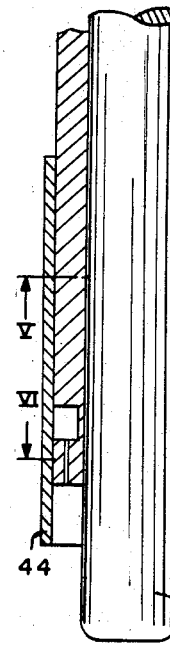
Figure 4 illustrates on an enlarged scale a portion of a modified form of barrel for a welding gun according to the present invention.

Basically the apparatus required to practice the present invention consists of a source of welding wire, means for feeding the wire to a welding gun, a welding gun, a source of welding current, a source of liquefied gas, and means for conveying the liquefied gas in its liquid state to the welding gun for expansion and delivery to the arc as a gaseous arc shielding atmosphere. Referring to Figure 1 a continuous wire electrode E is withdrawn from a reel 20 by feed rolls 21 driven by a wire feed motor 22 through appropriate power transmission apparatus. In manual apparatus, the electrode wire E is fed into a flexible casing 23 which guides and restrains the wire and permits it to be pushed through a length of casing to a welding gun 24. The welding gun structure includes an element which makes electrical contact with the surface of the wire permitting welding current to be introduced into the welding wire at a point within the gun and preferably at a point close to the discharge end of the barrel of the gun. In the apparatus of Figures 1, 2, and 3 the welding current is introduced into the wire as the wire passes through a metal contact tube 30 forming the main structure of the barrel 26 of the welding gun 24. Welding current may be supplied from any conventional source 27 which is connected to the contact tube 30 in the barrel 26 and the workpiece W to be welded. Cylinder 28 represents any source of liquefied gas such as a cylinder of carbon dioxide in liquid phase. In order to withdraw the liquid from the tank in the liquid phase, a discharge tube 29 projects into the cylinder to a point close to the bottom permitting the gas which collects in the top of the cylinder to force liquid out through the tube when the cylinder valve 31 is open. The liquid is conveyed by high pressure tubing 32 to the manifolding ring 33 at the back of the welding gun, from which the liquid is distributed to one or more small diameter tubes 34 extending the length of the barrel to discharge the liquid into the atmosphere at the forward end of the gun. As shown in Figures 2 and 3 there are four such small diameter tubes 34 and they are preferably set in heat exchange relation with the contact tube 30 such as by soldering or otherwise affixing them in equally spaced recesses in the outer surface of the contact tube. In addition to the contact tube 30 and the small diameter liquid tubes 34, the barrel of the gun preferably includes an outer insulating cover 36. For convenience in manual operation a handle 37 in the form of a pistol grip may be applied to the barrel to form therewith a welding gun. The contact tube 30 is preferably made of copper or some other metal or alloy of high electrical conductivity. The small diameter tubes 34 must be capable of withstanding high pressure and preferably have an inside diameter and wall thickness comparable to that found in hypodermic tubing, and in fact commercial hypodermic tubing may be employed in some instances. These tubes terminate in an orifice plate 38 having very small individual orifices, for example of the .01 inch orifice diameter. Care must be taken in designing the liquid distributing system to avoid a sufficient decrease in pressure within the system to cause the liquid to revert to the solid or gaseous phase prematurely. The liquid carbon dioxide can, if desired, be sub-cooled either in cylinder 28 and/or the passages 32, 34 by conventional means to obviate such difficulty.

In operation, the welding arc is maintained from the electrode E to the workpiece W as wire is fed by the wire feed motor 22 toward the arc at a rate to maintain the arc as the wire is melted and the molten metal transferred to the work. Liquid carbon dioxide delivered under the pressure of the head of gas in the cylinder 28 is delivered in liquid phase through the high pressure tubing 32 to the distributing manifold 33 and through tubes 34 to the forward end of the welding gun. As the liquid is discharged from the orifices in the orifice plate 38 at the ends of the tubes 34 it expands to gaseous carbon dioxide or to gas plus snow (solid phase carbon dioxide) to form an envelope of carbon dioxide about the end of the electrode, the arc, and the molten weld metal produced thereby. As the liquid expands from the pressure at which it is maintained as a liquid, which is in the neighborhood of 800 pounds per square inch, to atmospheric pressure, it absorbs great quantities of heat to produce a strong refrigeration effect in the vicinity of the expansion. This effect cools the welding gun, and eliminates the need for auxiliary water cooling commonly employed in arc welding apparatus. It may seem from Figures 1, 2, and 3 that the overall size of the welding gun, and consequently its weight, is considerably less than corresponding apparatus for use with carbon dioxide shielding gas delivered to the gun in a gaseous state. The expansion ratio of the carbon dioxide as it expands from the liquid to the gas is approximately 1 to 400. Consequently extremely small quantities of liquid are required to supply the required gas shield. It has been found for example, that the inside diameter of the tubing carrying liquid to the arc may be of the order of magnitude of but a few hundredths of an inch. With 800 lbs. pressure in the cylinder (the pressure at room temperature) about 10 to 15 pounds per hour of liquid carbon dioxide can be delivered through each tube 34 when the tube is approximately 6 inches in length and terminates in an orifice of about .01 inch in diameter. This quantity of liquid delivered at room temperature expands to about 100 cubic feet per hour of gaseous carbon dioxide at standard temperature and pressure. This expansion and vaporization produces a significant amount of cooling or refrigeration in a concentrated area at the arc end of the gun.

Figure 5:
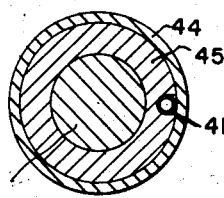
Figure 5 is a sectional view of the barrel of Figure 4 taken along line 5—5 of Figure 4.
Figure 6:
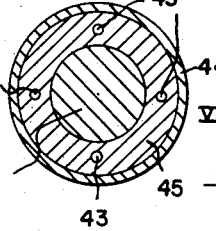
Figure 6 is a sectional view of the barrel of Figure 4 taken along line 6—6 of Figure 4.

Figures 4, 5 and 6 show a modification of the gun barrel in which the liquid is carried down the barrel through a single tube 41, and a distributing chamber 42 in communication with one or more small diameter delivery passages 43. A cylindrical member 44 may be soldered or otherwise affixed to the contact tube 45 in the manner shown in Figures 4, 5, and 6 to enclose the distributing chamber 42 and to form a skirt at the end of the barrel. In some instances such a skirt has been found beneficial to the effectiveness of the gas shield formed by the expansion of the liquid carbon dioxide to gaseous carbon dioxide. The visible effect of such a skirt is to increase the amount of solid carbon dioxide formed. In any event the expansion of the carbon dioxide against the skirt materially increases the refrigerating effect of the carbon dioxide on the entire apparatus.

Figure 7:
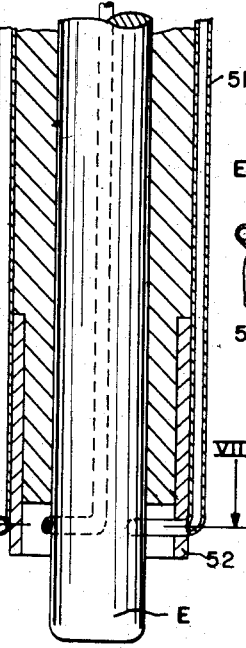
Figure 7 shows on an enlarged scale a portion of a welding gun barrel in accordance with a further modification of the invention.
Figure 8:
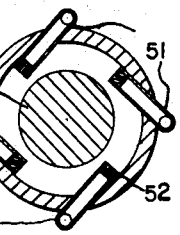
Figure 8 is a cross sectional view of the barrel of Figure 7 taken along line 8—8 of Figure 7.

Figures 7 and 8 illustrate a further modification in which the liquid is introduced from one or more tubes 51 to the space within a skirt 52 in a plane at right angles to the welding electrode wire with the individual streams being projected as tangents to the inside circumference of the skirt. This produces a swirling motion of the gaseous carbon dioxide as it expands and spills out as a swirling, expanding stream beyond the skirt to form the arc shielding envelope. Thus a circumferential distribution of the shielding gas around the arc may be obtained even when only a single liquid delivery tube and liquid discharge orifice are utilized. The direct impingement of the expanding carbon dioxide against the skirt increases the effectiveness of the refrigeration effect produced on the gun barrel by the carbon dioxide. While no insulating covering has been shown for the apparatus depicted in Figures 4 through 8, such covering would obviously be beneficial.

Figure 9:
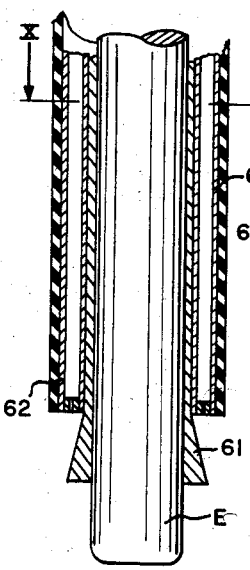
Figure 9 shows on an enlarged scale a portion of a welding gun barrel in accordance with a further modification of the invention.
Figure 10:
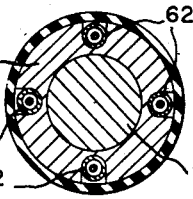
Figure 10 is a cross sectional view of the barrel of Figure 9 taken along line 10—10 of Figure 9.

Another way in which the refrigeration effect can be advantageously used is to form the contact tube 61 with an expanding end as shown in Figures 9 and 10. With this configuration the liquid carbon dioxide is projected from the small diameter tubes 62 against the expanded end of the contact tube 61 in such a manner as to withdraw heat from the contact tube at a high rate and simultaneously deflect the gas in a manner to form an expanding gas shield zone.

A further modification of the invention is depicted in

Figure 11:
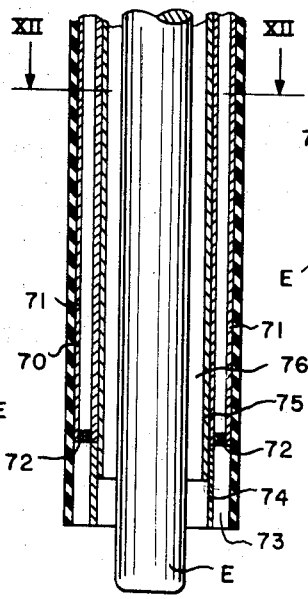
Figure 11 shows on an enlarged scale a portion of a welding gun barrel in accordance with a further modification of the invention.
Figure 12:
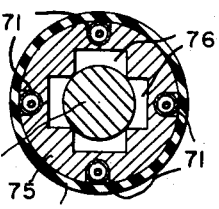
Figure 12 is a cross sectional view of the barrel of Figure 11 taken along line 12—12 of Figure 11.

Figures 11 and 12 in which only part of the shielding gas is derived from the expanded liquid delivered to the welding gun, and the remainder is delivered to the welding gun in the conventional gaseous form. Thus in Figures 11 and 12, liquid carbon dioxide may be conducted by tubes 71 to orifices 72 from which the liquid is expanded to gas within an annulus 73 formed between a metal nozzle 74 and a concentrically arranged extension of the insulating cover 70 on the barrel. This expansion within what is in effect a hollow nozzle refrigerates the apparatus effectively and causes an annular stream of gas to be delivered from the nozzle as a part of the total shielding atmosphere. Additional shielding gas, which may be gaseous argon or helium or some other inert gas, may be delivered inside the nozzle around the conventional contact tube or, as illustrated, inside a special contact tube 75 having provision therein for the passage of the gas. In a device of this type the shielding gas is fed through the crossed slots 76 alongside the electrode wire E to discharge around the wire within the nozzle 74. Carbon dioxide is fed through conduits 71 in liquid phase and expanded within the hollow nozzle to cool the nozzle and supply a surrounding stream of carbon dioxide around the argon or other shielding gas. While this species is believed to be best suited for use with a consuming electrode it should be pointed out that it is contemplated it will work equally well with a non-consuming electrode such as a tungsten electrode.

There are obviously other variations of the invention in addition to those illustrated and described herein. In all modifications the advantages of small size and adequate self contained cooling are present. It is to be understood that the invention is not limited to the particular forms shown but may be used in other ways without departure from its spirit as defined by the following claims.

I claim:

1. In a method of gas shielded arc welding in which a consumable electrode is continuously fed to the welding arc through a contact tube which supplies welding current to said electrode adjacent the arc end thereof, the improvement which comprises flowing an arc shielding agent under super-atmospheric pressure in liquid phase to the vicinity of the arc, expanding said shielding agent from liquid to gaseous phase while in heat exchange relationship with the arc end of said contact tube in order to cool the same, and passing said gas around said arc to shield the same from the ambient atmosphere.

2. A welding method according to claim 1 in which the arc is maintained in an inner stream of inert gas blanketed by an outer stream of expanded carbon dioxide, said inner stream being supplied to the arc by passage means located between said contact tube and said electrode.

3. In the art of electric arc melting, wherein an arc is maintained between molten metal formed at the work constituting one electrode and a second electrode spaced from the work, and wherein a gas is provided to shield the arc from the ambient air, the improvement comprising conveying an arc shielding medium in liquid form under super-atmospheric pressure to said second electrode, expanding the liquid to its gaseous phase only when the liquid reaches the arc end of the second electrode, thereby concentrating the refrigeration effect of the liquid to gas expansion at the arc end of the second electrode, and directing the gas flow about the arc as a shield therefor.

4. In a method of gas shielded arc melting in which a consumable electrode is continuously fed to the arc through a gun which supplies current to said electrode adjacent the arc end thereof, the improvement which comprises flowing an arc shielding agent under super-atmospheric pressure in liquid phase to the vicinity of the arc end of the gun, expanding said shielding agent from liquid to gaseous phase while in heat exchange relationship with the arc end of the gun in order to refrigerate the same, and directing the gas around said arc to shield the same from the ambient atmosphere.

5. In a method as set forth in claim 4, wherein the arc shielding agent is carbon dioxide.

6. In a method of gas shielded arc welding in which a consumable electrode is continuously fed to the welding arc through a welding gun which supplies welding current to said electrode adjacent the arc end thereof, the improvement which comprises flowing an arc shielding agent under super-atmospheric pressure in liquid phase to the vicinity of the arc end of the gun, expanding said shielding agent from liquid to gaseous phase while in heat exchange relationship with the arc end of the gun in order to refrigerate the same, and directing the gas around said arc to shield the same from the ambient atmosphere.

7. In the method as set forth in claim 6, wherein the arc shielding agent is carbon dioxide.

8. Arc welding apparatus comprising an arc welding gun including a contact tube for supplying current to a welding electrode fed through the tube, means for delivering carbon dioxide in liquid phase to said gun, means including a nozzle surrounding said contact tube in the vicinity of the arc end of said electrode for expending said liquid carbon dioxide to the vapor state and to direct gaseous carbon dioxide so produced to form an envelope of shielding gas around a welding arc formed at the end of said electrode, said contact tube and nozzle being in heat exchange relationship with the expanding carbon dioxide.

References Cited in the file of this patent

UNITED STATES PATENTS

| | | |
|---|---|---|
| 1,589,017 | Lincoln | June 5, 1926 |
| 1,746,207 | Alexander | Feb. 4, 1930 |
| 2,281,335 | Somes | Apr. 28, 1942 |
| 2,497,629 | Rieppel | Feb. 14, 1950 |
| 2,504,867 | Muller | Apr. 18, 1950 |

OTHER REFERENCES

General Electric Review, the article on pages 169–174, March 1926 edition.